June 23, 1931.  H. E. MORTON  1,811,363
MILLING MACHINE
Filed May 22, 1929    7 Sheets-Sheet 1
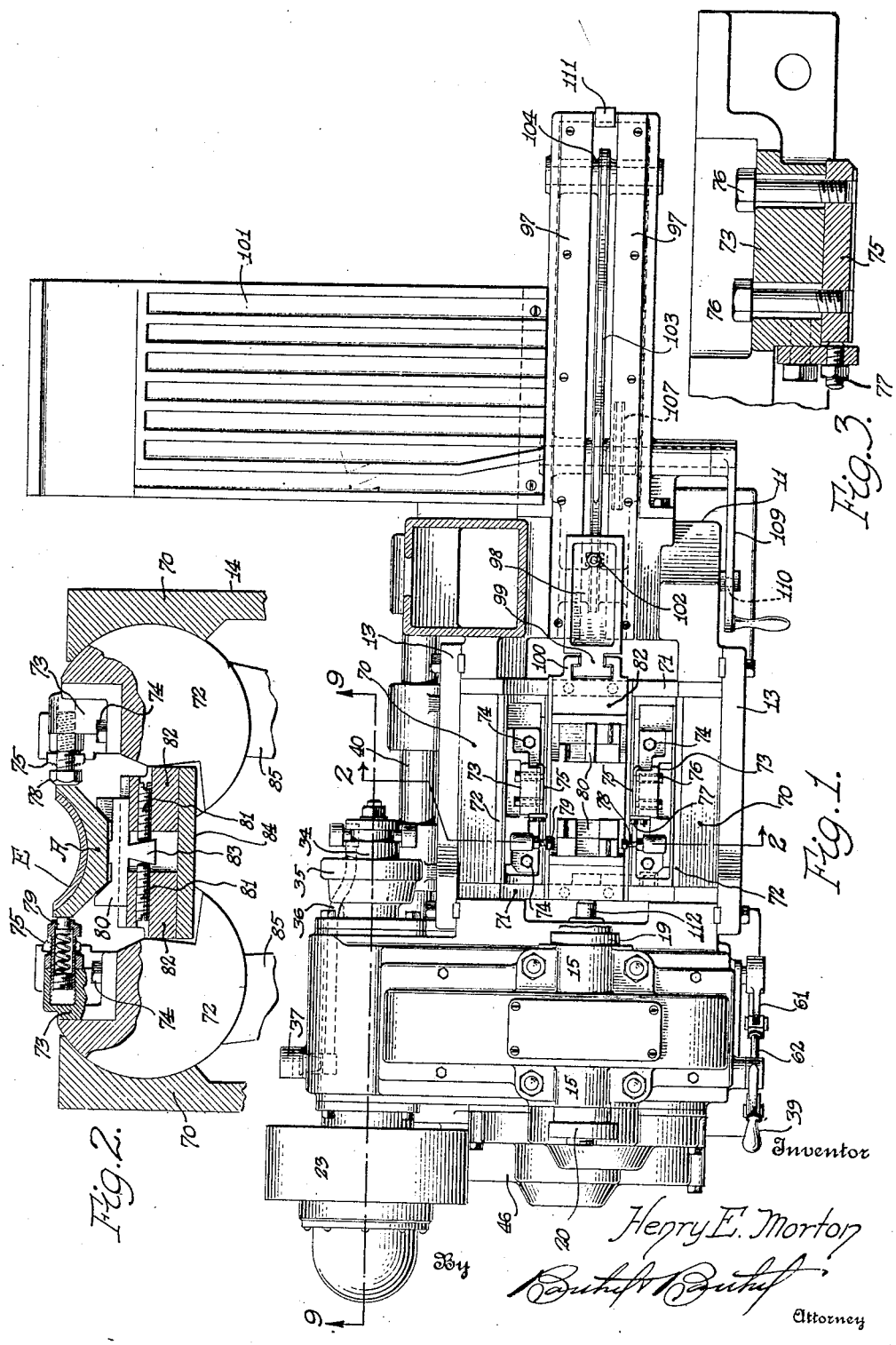
Inventor
Henry E. Morton
By
Buhl & Buhl
Attorney June 23, 1931.  H. E. MORTON  1,811,363
MILLING MACHINE
Filed May 22, 1929  7 Sheets-Sheet 2
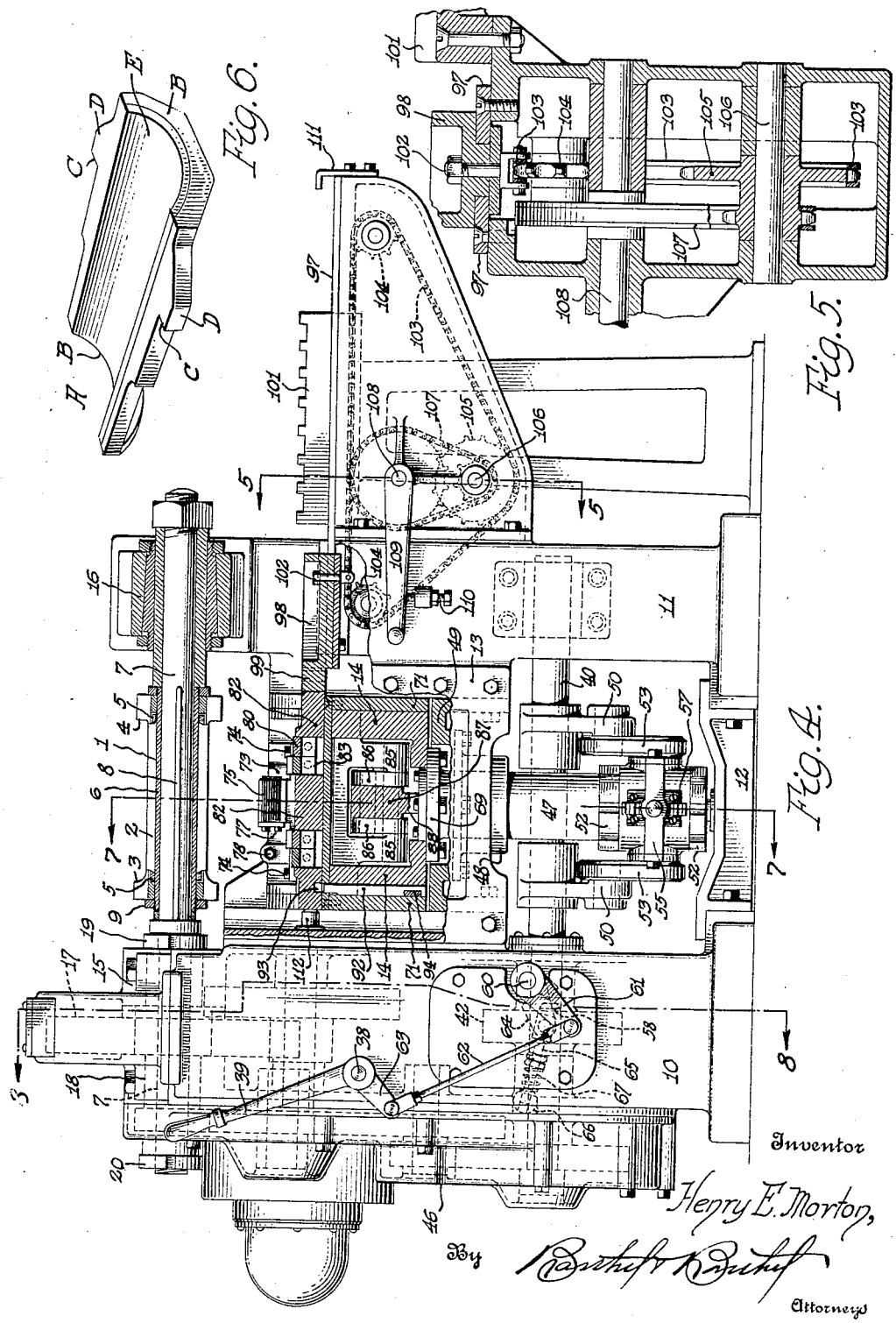
Inventor
Henry E. Morton,
By Barthel & Barthel
Attorneys Inventor
Henry E. Morton,
By
Attorneys June 23, 1931.                    H. E. MORTON                    1,811,363
                                 MILLING MACHINE
                    Filed May 22, 1929        7 Sheets-Sheet 4
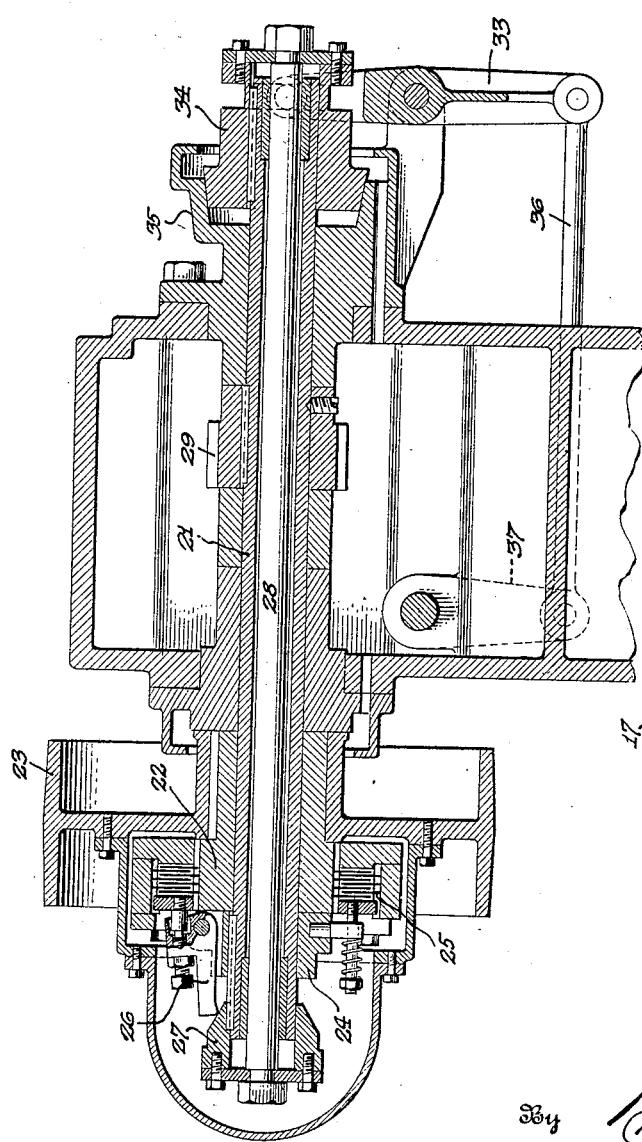
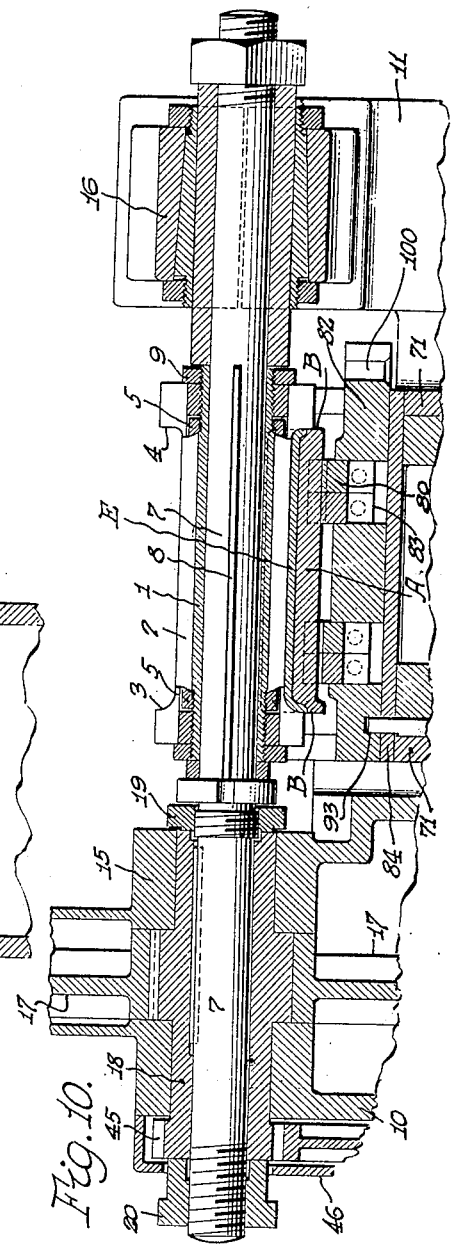
Inventor
Henry E. Morton,
By
    Attorneys

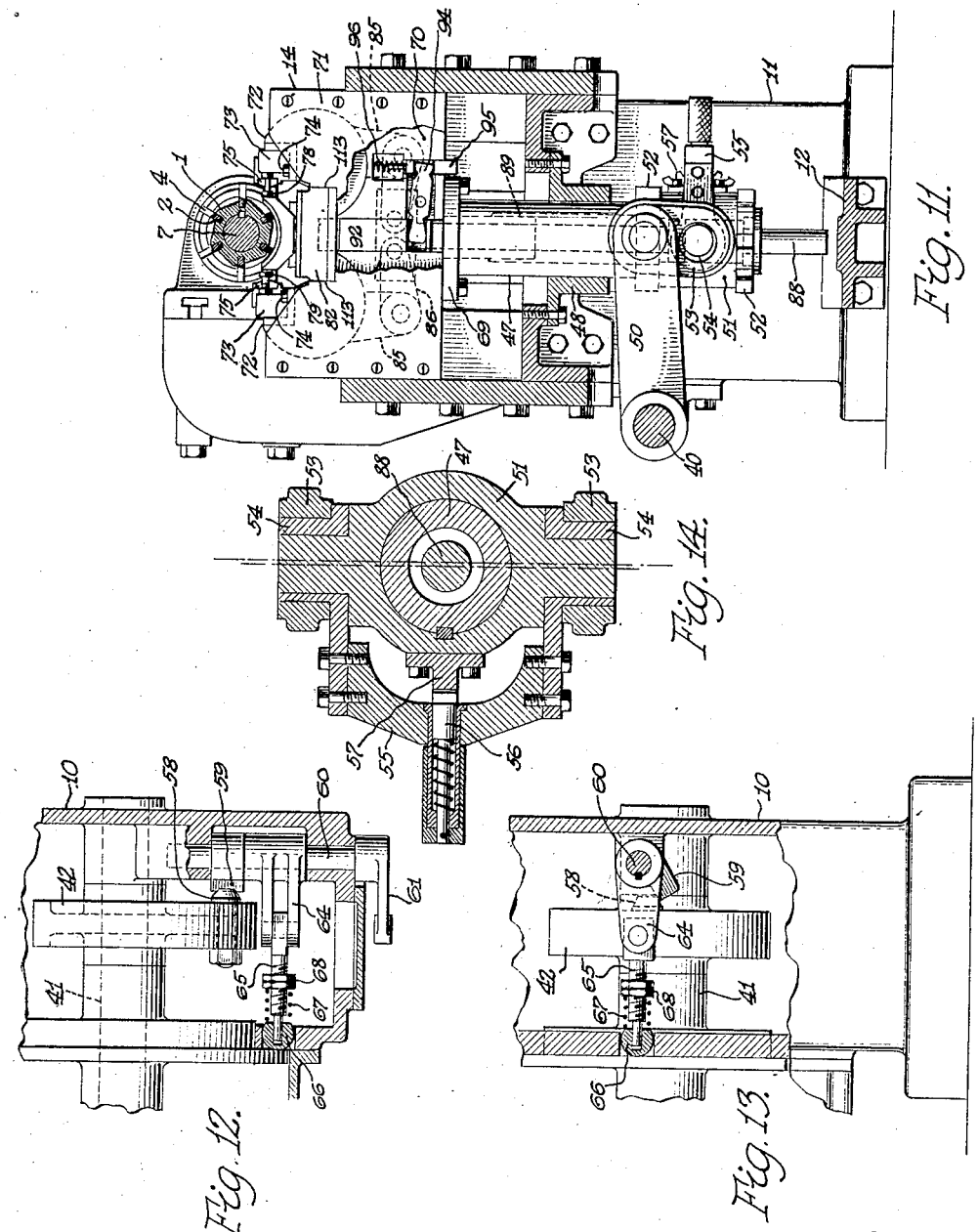

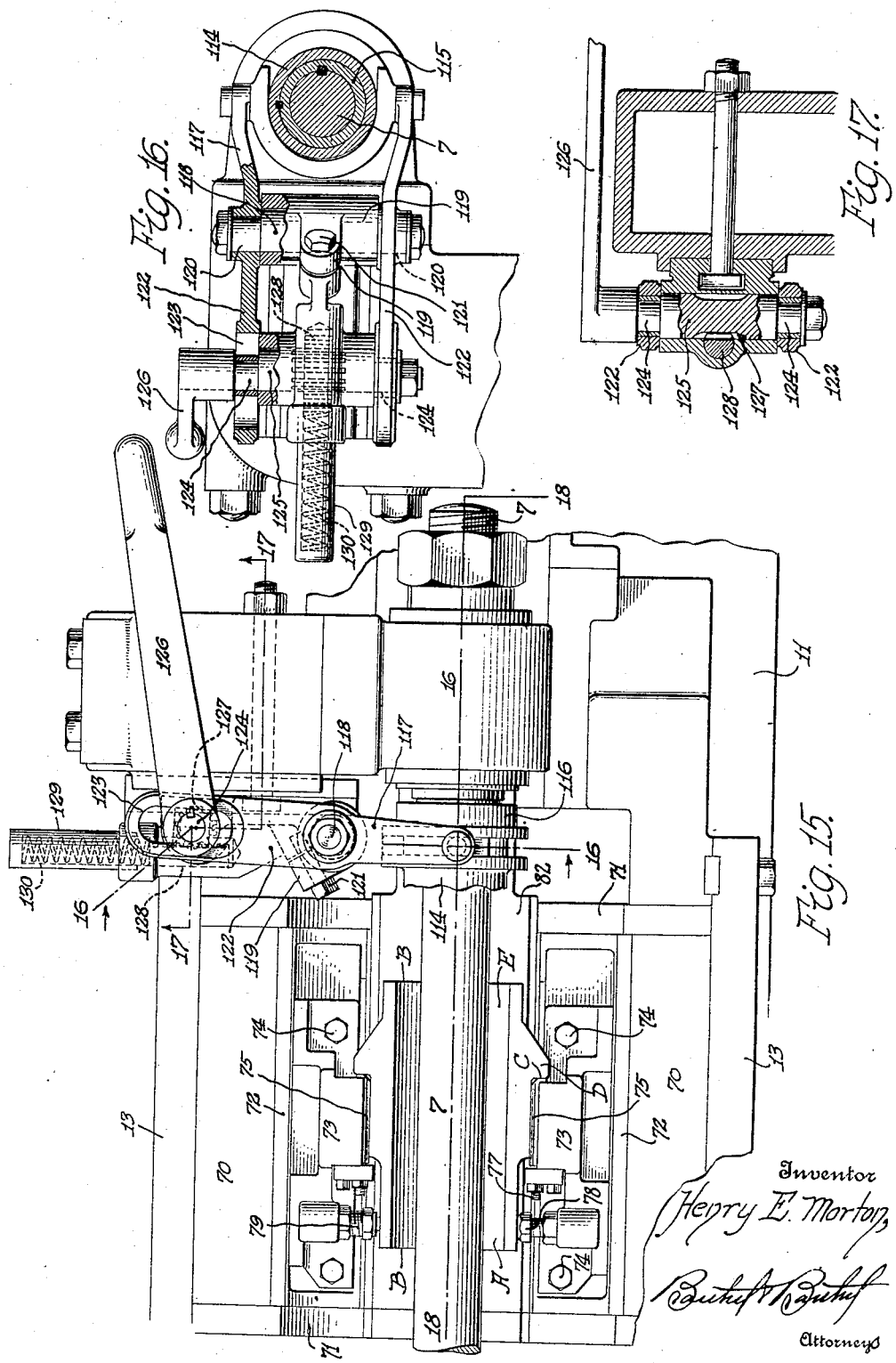

June 23, 1931.  H. E. MORTON  1,811,363
MILLING MACHINE
Filed May 22, 1929   7 Sheets-Sheet 7

Inventor
Henry E. Morton,
By
Attorneys

Patented June 23, 1931

1,811,363

UNITED STATES PATENT OFFICE

HENRY E. MORTON, OF MUSKEGON HEIGHTS, MICHIGAN

MILLING MACHINE

Application filed May 22, 1929. Serial No. 365,187.

This invention relates to that class of machines known as milling machines and more particularly to a machine especially adapted for finishing railway-car bearing-brasses, such as disclosed in Patent No. 1,261,432, dated April 2, 1918.

The present invention aims to facilitate the handling of such comparatively heavy pieces of work, increase production and give greater accuracy in operation. A further object is to provide efficient control of the machining operations and afford quick adjustment thereof, together with an arrangement providing semi-automatic operation. It is also an object to provide automatically operating means for accurately positioning and holding work of the character described and to provide certain other new and useful features in the construction, arrangement and combination of elements, all as hereinafter more fully set forth.

With the above and other ends in view, the invention consists in the matters hereinafter described and more particularly pointed out in the appended claims, reference being had to the accompanying drawings in which Figure 1 is a plan view of a machine illustrative of an embodiment of the present invention and showing portions broken away and in section;

Fig. 2 is an enlarged cross-section detail of clamping jaws substantially upon the line 2—2 of Fig. 1;

Fig. 3 is an enlarged sectional detail showing an adjustable stop plate for locating work endwise;

Fig. 4 is a side elevation of the machine with portions broken away and in section substantially upon the longitudinal center line of the machine;

Fig. 5 is a transverse section upon the line 5—5 of Fig. 4;

Fig. 6 is a perspective view of a piece of work machined by the machine;

Fig. 9 is a longitudinal sectional detail upon the line 9—9 of Fig. 1;

Fig. 10 is an enlarged longitudinal sectional detail of a milling tool and adjacent parts of the machine;

Fig. 11 is a transverse section of the machine similar to that of Fig. 7 but looking in the opposite direction and with parts broken away to more clearly disclose the construction;

Fig. 12 is a detail showing stop mechanism in elevation and adjacent parts of the machine in section;

Fig. 13 is a side elevation of said stop mechanism and showing adjacent parts in section;

Fig. 14 is a sectional detail on the line 14—14 of Fig. 7;

Fig. 15 is an enlarged plan view of that portion of the machine adjacent the cutting tool and work carrier, said figure showing a modification of or addition to the machine for adjusting the cutting tool;

Fig. 16 is a section substantially upon the line 16—16 of Fig. 15;

Fig. 17 is a section on the line 17—17 of Fig. 15; and

Figures 7, 8:
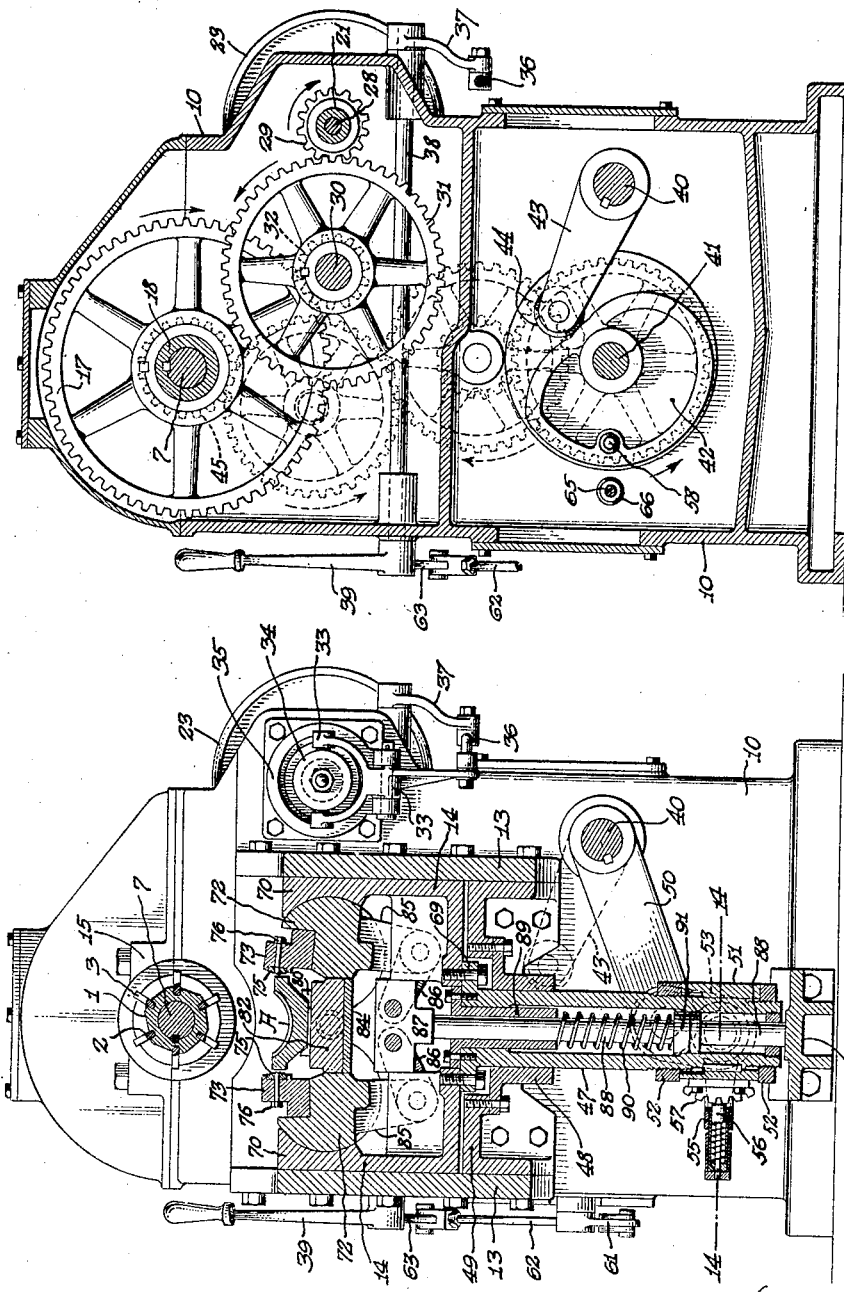
Fig. 7 is a transverse section upon the line 7—7 of Fig. 4.
Fig. 8 is a similar section upon the line 8—8 of Fig. 4.
Figure 18:
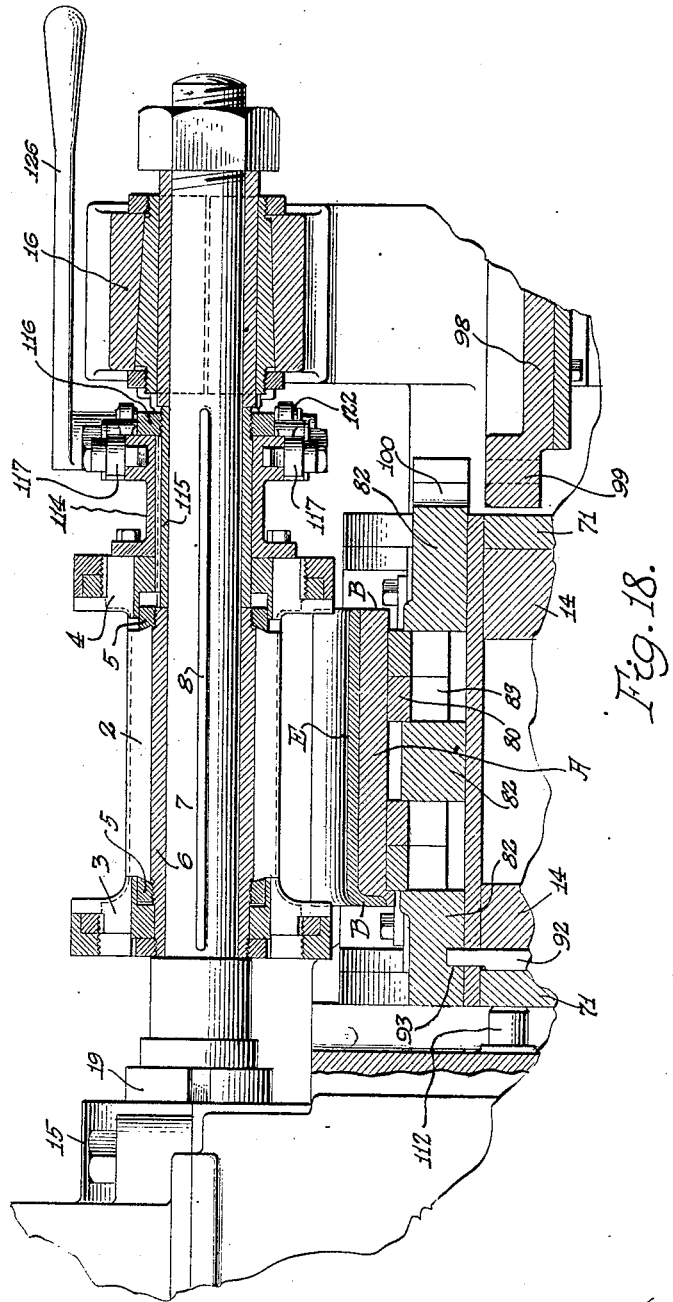
Fig. 18 is a vertical longitudinal section substantially upon the line 18—18 of Fig. 15 through the milling or cutting tool and adjacent parts of the machine.

This machine is particularly adapted for milling or finishing to accurate dimensions, Babbitt lined bearing-brasses for railway car journals, such as illustrated in Fig. 6 of the drawings, it being essential that the over-all length of the body A be maintained within certain predetermined limits, the end faces B of the body properly machined relative to the end faces C of lugs D projecting laterally from the body, and the thickness of the concave wall of the body, plus the Babbitt lining E, accurately limited and the lining properly machined.

To perform this work, a milling cutter 1 of the proper dimensions is provided, comprising a series of blades 2 for milling the concave babbitted surface E and end cutters 3 and 4 for forming the end surfaces B and rounded corners where these surfaces join the Babbitt surface. The ends of the blades 2 are beveled, as more clearly shown in Fig. 10, and collars 5 are formed with a corresponding beveled side to engage and clamp the blades between them, said collars being internally screw-threaded to screw upon a sleeve 6 through which the drive shaft 7 extends and to which shaft the sleeve is secured to turn therewith by means of a spline 8. The end cutters 3 and 4 are clamped in place upon the sleeve between the collars 5 and collars 9 on the sleeve.

A supporting frame comprises two spaced apart pedestals 10 and 11 which are connected at their lower ends by a base member 12 and intermediate their ends by plates 13 which tie the pedestals together and from between these plates, a vertical guide-way for a vertically reciprocable head or frame 14. On the upper ends of the pedestals 10 and 11 are provided bearings 15 and 16 respectively for the ends of the shaft 7 which is thus supported to extend across the space between the pedestals and carry thereon within this space and directly above the vertically reciprocable head 14, the milling cutter 1.

The pedestal 10 forms a gear box for a train of gears for driving the milling-cutter shaft 7, there being a large gear 17 keyed to a tubular bearing member 18 (see Fig. 10) which in turn is keyed to the shaft 7, said shaft extending through the bearing member and made adjustable longitudinally therein for adjusting the cutter 1 endwise, by screwthreading the shaft at each end of the member and providing adjusting nuts 19 and 20 on the shaft in engagement with the ends of said member 18. A hollow drive shaft 21 (see Fig. 9) is mounted in suitable bearings on the pedestal with its ends projecting beyond these bearings, and mounted upon one end of this shaft to turn freely thereon is a driving clutch member 22 of a multiple disk clutch upon which member 22 a driving pulley 23 is keyed. A driving clutch member 24 is keyed upon the end of shaft 21 and the usual friction disks 25 are carried by these members and arranged in the usual manner to transmit motion from the driving to the driven member when said disks are brought into frictional engagement by means of a series of pivoted bell crank levers 26 arranged in the usual manner to be operated by means of a cone 27 slidable upon the projecting end of said shaft 21 and moved endwise by a rod 28 passing through the hollow shaft, to engage the ends of said bell cranks and spread said ends apart to rock said levers and bring the disks into frictional contact with each other.

Within the casing formed by the pedestal 10, is a pinion 29 keyed to the shaft 21 (see Figs. 8 and 9) and mounted on an intermediate shaft 30 is a large gear 31 in mesh with the pinion 29, with a second pinion 32 on said shaft 30 in mesh with the large gear 17 on the shaft 7 of the milling cutter. Driving power from the pulley 23 is thus transmitted through the multiple disk clutch to shaft 21 and from said shaft by means of the gear train, to the shaft of the milling cutter.

To move the rod 28 endwise for the purpose of operating the clutch and connecting the drive pulley to the shaft 21, an operating yoke lever 33 is pivotally supported intermediate its ends upon a suitable bracket adjacent the end of the shaft 21, opposite that to which the clutch is connected, and the yoke of this lever is operatively connected to a cone 34 slidable longitudinally upon and splined to the end of said shaft with said cone connected to the end of rod 28 so that cone and rod are moved together by the swinging of said yoke lever, and on the casing formed by the pedestal and secured rigidly thereto, is a cup 35 to receive the cone so that when the rod is moved to disengage the clutch, the cone will engage the cup and serve as a brake to stop rotation of shaft 21 and thus stop rotation of the milling cutter, as soon as the transmission of power from the pulley 23 is stopped by the disengagement of the clutch. The lower end of the lever 33 is connected by a rod 36 to a crank arm 37 on a cross shaft 38 mounted in bearings on the pedestal and extending transversely through said pedestal. An operating hand control lever 39 is secured on the projecting end of the shaft 38 for turning the same and thus stopping or starting the machine and controlling the rotation of the cutter by operating the clutch.

Mounted in suitable bearings on the pedestals 10 and 11 and extending across the space between the same and into the hollow pedestal 10, is a rock shaft 40, and mounted in suitable bearings in the pedestal is a cam shaft 41 extending parallel with the crank shaft. On the cam shaft within the pedestal is a cam 42 and on the rock shaft 40 is an arm 43 (Figs. 7 and 8) carrying a roller 44 to ride upon the cam. Motion is transmitted from a pinion 45 (Fig. 10) formed on the tubular member 18 to turn therewith when the cutter shaft 7 is rotated, by means of a train of gearing shown in dotted lines in Fig. 8 and housed within a suitable housing 46 (Fig. 4) on the outer side of the pedestal 10. Therefore when the machine is started by means of the lever 39 which operates the multiple disk clutch 25 and causes the transmission of power from the drive pulley 23 to the member 18 carrying the pinion 45, power will also be transmitted at the proper relative speed to turn the cam shaft 41, which in turn transmits a rocking motion to the rock shaft 40 by the engagement with the cam 42 thereon, of the roller 44 on the arm 43 secured to said rock shaft.

The rocking motion of the shaft 40 imparts a vertically reciprocating motion to a plunger 47 reciprocable in a suitable bearing 48 carried by a fixed head or closure 49 (Figs. 4, 7 and 14) for the lower end of the guideway formed between the plates 13 and adjacent sides of the pedestals 10 and 11, for the vertically reciprocable head 14, and this head 14 is rigidly secured to the upper end of said plunger 47 to be moved vertically in its guideway by said plunger. To transmit motion from said rock shaft 40 to said plunger 47, a pair of spaced apart arms 50 is secured to said shaft with their free ends extending at each side of the lower end of the plunger which is provided with a trunnion sleeve 51 adjustably held in place on the plunger by collars 52, said trunnion sleeve being formed with laterally and oppositely extending trunnions upon which are pivotally mounted the lower ends of links 53, the upper ends of which links are pivotally connected to the free ends of the arms 50.

To vary the upward stroke of the plunger 47 relative to the swinging movement of the arms 50 and thus vary the height to which the plunger and head 14 will be raised, eccentric bushings 54 (see Fig. 14) are interposed between the links 53 and the trunnions and these bushings are provided, each with a laterally extending arm, with these arms connected together by a yoke 55 by means of which the bushings may be turned to adjust the links relative to the axis of the trunnions and thus in effect, lengthen or shorten slightly the link connection between said arms and plunger and raise or lower the plunger relative to said arms. A pawl 56 is carried by the yoke and a ratchet 57 is secured to the sleeve 51 to hold the yoke and bushings in the position to which they may be rotated by the adjustment of the yoke. The upward limit of the stroke of the head 14 may therefore be quickly and accurately adjusted to vary the distance between said head and milling cutter 1 when the head is at the extreme upper end of its stroke.

To limit rotation of the cam shaft 41 and automatically release the clutch 25 to stop the machine, a stop lug or pin 58 is provided on the cam 42 to engage a dog 59 on a short shaft 60 mounted in bearings in the pedestal 10 and projecting through the same wall of the pedestal as the shaft 38 (see detail Figs. 12–13) and on the outer end of this shaft 60 is an arm 61 connected by a connecting rod 62 to the free end of a like arm 63 (see Fig. 4) on the projecting end of shaft 38 upon which the operating or control hand lever 39 is mounted. Therefore when the hand lever 39 is operated to throw in the clutch 25 and start the machine, motion will simultaneously be imparted through the connecting rod 62 to turn the shaft 60, which turning of said shaft will throw the dog 59 up into the path of the stop pin 58 on the cam 42, so that when said cam has made a complete revolution, the pin will engage the dog and rotate the shaft 60 in an opposite direction and through the connection of said shaft to the shaft 38, automatically throw out the clutch and stop the operation of the machine.

To yieldingly hold the shaft 60 in the position to which it is turned with the clutch 25 either in or out, a yielding toggle device is provided consisting of a pair of parallel arms 64 secured to the shaft 60, a rod 65 pivoted between the free ends of said arms at one end and having a sliding connection with a ball 66 at its opposite end with a spring 67 sleeved on the rod between said ball and adjusting nuts 68 on the rod, said ball being mounted in a recess in the wall of the pedestal 10, for free turning movement. The spring thus exerts a force to yieldingly hold the arms 64 turned to the limit of their swinging movement in either direction with the hand lever 39 either in inoperative position with the clutch thrown out, or in operative position with the clutch in and the machine in operation.

The upper end of the plunger 47 is flanged and bolted as at 69, directly to the center of the lower end of the vertically reciprocable head 14 comprising two formed blocks 70 secured together by end plates 71, said blocks being slidable in contact with the connecting plates 13 forming the sides of the way for the head, and the plates 71 being in sliding contact with end surfaces of the adjacent ends of the pedestals 10 and 11 which form the ends of said vertical guideway. The adjacent inner faces of these blocks are formed with semi-circular seats for clamping members 72 which are formed semi-circular in cross-section to seat within said seats as clearly shown in Fig. 7, and each clamping member is provided with a fixed clamping jaw 73, each comprising a block firmly bolted as at 74 in place within a notch or recess in the upper part of each clamping member. A roughened grip or face plate 75 is secured within a groove in the face of each jaw to engage the sides of the bearing brass and hold it in position while being milled, and these grip or face plates are so held that they may be adjustable endwise for the purpose of properly locating the work, the forward ends of said plates being arranged to engage the faces C of the laterally extending lugs D. To so adjustably hold these plates, (see Fig. 3) bolts 76 pass through elongated holes in the jaws, and an adjusting screw 77 is provided to engage the rear end of each plate so that said plates may be accurately adjusted and thus form accurate stops against which the work is located.

The work is properly located laterally between the jaws by means shown in detail in Fig. 2 comprising an adjustable stop screw 78 carried by one jaw 73 at one side of the work and a yieldable stop pin 79 carried by the opposite jaw and engaging the opposite side of the work, said stops being positioned toward the rear end portion of the bearing-brass or that portion adjacent the end opposite that provided with the lugs D.

The work or each bearing-brass is firmly seated in a V-block 80 (see Fig. 2) comprising pairs of independently adjustable members each formed with a single inclined seat to oppose a like inclined seat on the other member of each pair, the members of each pair together providing a seat having oppositely inclined surfaces between which the work is seated, said inclines engaging the inclined lower sides of the bearing-brass. These members of each pair are adjusted laterally of the work by means of adjusting screws 81 carried by a carrier block 82 and engaging opposite sides of a lug 83 on each member projecting centrally thereof downwardly into an opening in the carrier block. The V-block may, therefore be accurately adjusted laterally to bring the vertical axial plane of the bore or Babbitt lining E of the work into coincidence with the vertical axial plane of the milling cutter 1. Preferably the lugs 83 are undercut toward the members of the V-block so that these members will be firmly held down upon the carrier block 82 by the engagement of the ends of said screws with the upwardly and oppositely inclined or undercut sides of the lugs.

A plate or bed 84 is firmly bolted or otherwise secured at its ends to the end plates 71 of the head 14, said end plates being cut away or notched inwardly from their upper ends as shown in Fig. 11 to receive said bed plate and to also permit of endwise sliding of the carrier block 82 from the bed through such opening, said carrier block being unsecured to this bed and free to slide longitudinally therefrom, the clamping members 72 being also cut away at their adjacent sides as shown in Fig. 2 to provide for said bed plate and carrier block, and at the same time permit limited rotative movement of said clamping members in their seats in the blocks 70 for the purpose of moving the jaws 73 toward each other and clamping therebetween the work supported on the V-blocks 80 and carrier block 82. As this bed plate 84 is rigidly secured to the vertically reciprocatable head 14, it rises and falls with the head, carrying any work positioned on the carrier block up into milling position and lowering it therefrom.

To turn the clamping members 72 and clamp the work between the jaws 73 in timed relation to the vertical movements of the vertically reciprocable head 14, each clamping member is provided with a downwardly extended arm 85 and pivotally attached at one end to the lower ends of these arms, are links 86, which links are in turn pivotally attached at their opposite ends to a head 87 secured upon the upper end of a rod 88 longitudinally reciprocable through a bushing 89 secured within the upper open end of the bore of the plunger 47, (see Fig. 7). The head 87 is guided between opposed surfaces on the blocks 70 of the head 14 for accurate sliding movement, and said rod 88 is of such a length that when the head 14 is lowered by the plunger, said end of said rod which projects from the lower end of the plunger, will come into contact with the base member 12 before the head reaches the lower end of its stroke and thus stop the rod prior to the head reaching such limit, and thus, through the link connection of the rod with the arms 85, turn said clamping members 72 and open the jaws to release the work.

Upon upward movement of the head 14, the jaws will at once start to close due to the fact that the rod remains in contact with the base 12 throughout the first portion of the upward movement of the head 14 and while the jaws are being carried up by the head 14 and thus turned by their link connection with the head of the rod, said rod being yieldingly held by a coiled spring 90 sleeved thereon in the bore of the plunger 47 between the inner end of the bushing 89 and a piston 91 on the rod working in the plunger bore. When the head 87 on the rod seats upon the upper end of the upwardly moving plunger 47, said rod then rises with the head 14 but the jaws by this time have been turned into clamping position, and upon further upward movement of head 14, will be held in that position by the action of the spring 90. A cushioning effect on the closing and opening of the jaws is secured through the operation of the piston 91 in the bore of the plunger 47.

The work is thus accurately centered laterally and firmly clamped in place upon the head 14 to move therewith into milling position so that the bore E of a bearing-brass will be accurately milled to the exact overall length and thickness of wall and in proper relation to the lugs D each time a brass is placed upon the V-block 80 and raised into contact with the milling cutter by the operation of the cam 42 which is caused to make one revolution in raising the head 14 and lowering the same to the limit of its movement where the machine is automatically stopped by the operation of the stop pin 58 on the cam coming into engagement with the dog 59. This cam 42 is so shaped as to gradually lift the head 14 to the limit of its upward movement and hold it in that position, there being a dwell in the cam, and then the cam drops off rapidly, causing a quick lowering of the head to the extreme lower end of its movement where it is stopped by the automatic stopping of the machine.

When the carrier block 82 is in place upon the bed or head plate 84 of the vertically movable head 14 and accurately located thereon, it is locked against possible endwise movement after the head starts to rise, by a locking bar 92 mounted for vertical endwise movement in a groove or way in the head to be projected upwardly through an opening in the plate 84 into an opening 93 (see Fig. 4) provided therefor in the bottom of the carrier block 82, and this locking movement of said bar is effected by means of a rocker-bar 94 (see Fig. 11) which is pivotally supported intermediate its ends within a recess in the head 14 with one end engaged within a slot or notch in the lower end of the locking bar and its opposite end within a notch in a vertically reciprocable plunger 95, which plunger is mounted for reciprocation within a bore in one of the blocks or castings 70 forming the head with said bore opening through the bottom of the head so that said plunger may project therefrom when the head is raised away from the closure head 49 for the lower end of the guide way for the reciprocable head 14. A spring 96 operates on the upper end of the plunger to project it from the bore as soon as the head 14 is lifted and thus rock the rocker-bar 94 and raise the locking bar 92 into the opening 93 in the carrier block to firmly lock said carrier in place against endwise movement on the vertically reciprocable head. When the head approaches the lower end of its stroke, the plunger 95 is brought into engagement with the bottom or head 49 of the guideway and is pressed inward thereby, rocking the rocker-bar and thus retracting the locking bar from the carrier block just before the head 14 reaches the lower end of its stroke.

To facilitate the placing of the bearing-brasses, one at a time upon the carrier block 82 and then placing this block upon the plate 84 of the vertically movable head in position to be lifted toward the milling cutter, a table or horizontal guide-way 97 in the form of a long bracket, is secured to one side of the pedestal 11 to extend outwardly therefrom with said way in the horizontal plane of the upper surface of the plate 84 when the head 14 is at the extreme lower end of its stroke, and mounted on this guideway to reciprocate freely thereon is a carriage 98 having a longitudinally extending end tongue 99 of T-form in plan view adapted to fit into a vertically disposed channel way 100 formed on the adjacent end of the carrier block 82 to receive and interlock with the tongue on the carriage so that movement of the carriage along its way will pull or push the carrier block, sliding said block onto or off from said head, and by reason of the form of interlock between carriage and block, permitting the block to be lifted vertically out of engagement with the carriage by the upward movement of the lifting head 14.

The carriage 98 is guided in its guideway 97 in any suitable manner and when moved to the outer end of said way, will drag the block with it along the way to a point opposite the end of a loading table 101 which extends at right angles to the way and upon which several brasses may be placed and slid, one at a time, onto the V-block 80 mounted on the carrier block 82, the finished brass on the carrier being removed as the unfinished brass is put in place.

To facilitate the moving of the carriage and carrier block along the guideway 97, said carriage is connected as by a bolt 102 (see Fig. 4) to a link of a continuous chain 103 which is led over a pair of sprockets 104 to form a run of the chain extending the length of the guideway directly below the same, said chain also extending over a large sprocket 105 on a shaft 106 which shaft has also secured thereto a small sprocket over which another chain 107 passes, said chain 107 passing around a large sprocket on a second shaft 108 on the outer end of which a hand crank 109 is secured for turning its shaft and imparting motion to the carriage through the chain 103. An adjustable stop screw 110 is provided for limiting the turning movement of the hand crank in one direction and limit the movement of the carriage, and a stop 111 is provided at the outer end of the guideway 97 to limit the movement of the carriage in the opposite direction.

When the carrier block is pushed endwise by the carriage, into position upon the head 14, said block is accurately positioned longitudinally by coming into contact at its inner end with a stop 112 located in a recess in the vertical way for the head, and said block is located laterally by passing through the cut-away portions or notches in the end plates 71 of the head, said block fitting between the sides of these notches, which sides 113 (see Fig. 11) engage, guide and hold the block in place against lateral movement upon the bed plate 84.

By this arrangement, the loading and unloading of the machine is greatly facilitated as, when the machine is automatically stopped as previously described, the head will be in its lowermost position and in the plane of the guideway so that the carrier block may be readily pulled endwise from the head onto the way to a position where the work is readily accessible for removal and for the replacement of another piece, this movement of the block being quickly effected by operating the hand lever 109, the block being coupled to the carriage 98 to move therewith, and this coupling of the carrier block to the carriage being automatically effected by the lowering of the block by the head 14 into alignment with the carriage. The uncoupling of said block and carriage is likewise effected by the lifting of the block vertically by the head, the carriage remaining in position to again effect coupling when the head is lowered after the milling operation has been completed.

The operator may find that, due to slight variations in wall thickness of the cast brasses, it is necessary to change the upward stroke of the plunger 47 slightly and thus on certain pieces, cause the head 14 to approach a few thousandths nearer the milling cutter or to stop a few thousandths farther away, and to quickly effect such regulation, he will swing the yoke 55 one or more notches up or down as the case may be, thus rotating the eccentric bushings 54 and lowering or raising the plunger and head relative to the operating arm 50 which have a fixed throw.

The operator may also find that the cast brasses vary somewhat in length and may therefore require that a greater or less amount of metal be removed from one of the end faces B. To provide for such adjustment, a modified construction of milling cutter is shown in Figs. 15, 16, 17 and 18, the end cutters 4 being mounted upon an outer sleeve 114 in any suitable manner with this outer sleeve splined for longitudinal movement upon an inner sleeve 115 which is secured against longitudinal movement upon the shaft 7 to turn therewith, an adjustable collar 116 being screwed upon the end of the inner sleeve against the end of the outer sleeve to limit its longitudinal movement. By moving the outer sleeve endwise, the cutters 4 are also moved to increase or decrease the cut forming the end face B of the bearing brass.

To thus adjust the cutters 4, the sleeve 114 is moved longitudinally by means of a yoke 117 embracing the sleeve and operatively connected thereto in the usual manner, said yoke being pivotally supported intermediate its ends upon an eccentric pivot pin 118 which is clamped against turning within a split bearing 119 therefor, said yoke being pivoted to turn freely upon eccentric end portions 120 of the pin, so that by slackening the clamping bolt 121 said pin may be turned in said bearing to change the position of the axis of pivotal support for the yoke and secure an adjustment of the throw of the yoke relative to its pivotal connection to the sleeve. The arms 122 of the yoke projecting beyond the bearing 119 are formed with longitudinal slots 123 and extending through these slots are end portions 124 of an operating pin 125 mounted for free rotation in a bearing 126 between said arms, said end portions 124 being formed eccentric to the bearing portion of said pin 125 so that when said pin is turned by means of a handle 126 on the pin, the yoke will be swung upon its pivot and move the sleeve 114 and cutters 4 the few thousandths of an inch required. A slight increase or decrease in the over-all length of a particular bearing brass may therefore be regulated at will by the operator, and in order that the cutters may be automatically returned to their original setting after finishing that particular piece, said pin 125 is formed with gear teeth 127 which are engaged by a rack 128 slidable in one direction within a suitable housing or way 129 against the action of a coiled spring 130 in the housing exerting a force upon the end of the rack to move it in a direction opposite to that in which the rack is moved by engagement with the teeth 127 on the operating pin 125, when said pin is turned by means of the handle 126. Therefore, immediately upon release of the handle 126 by the operator, said spring 130 will act to return the handle to normal position and thereby return the cutters to their original setting determined by the adjustment of the pin 118 and also by the collar 116.

The present machine is particularly adapted for machining Babbitted bearing brasses for railway cars and is constructed to greatly facilitate the work by making the machine semi-automatic in its operation. The loading and unloading of the machine is expedited by providing a movable carrier block for the work and hand operated means for moving said block into and out of operative position, so that the finished work may be conveniently removed and new work accurately positioned. The positioning and removal of the work is also facilitated by providing the vertically movable head for carrying the work up to the milling cutter, and this placement and removal is accomplished while the machine is at rest, it having been automatically stopped after the completion of the milling operation, but the accurate locating of the work is mechanically effected and is therefore exact, insuring accuracy in machining. But while the machining operation is automatic, adjustment may be effected to take care of variations in the dimensions of the castings and therefore a uniform product is secured.

Obviously changes may be made within the scope of the appended claims, in the construction, arrangement and combination of the several elements embodied in the present machine, without departing from the spirit of the present invention, and I do not, therefore limit myself to the particular construction shown.

Having thus fully described my invention, what I claim is:—

1. A milling machine including a milling cutter, means for rotating said cutter, a vertically movable head beneath said cutter, a work holder on said head removable therefrom, a horizontally reciprocable member to interlock with said holder when said holder is in lowered position, means for receiving said member, and means for raising and lowering said head.

2. A milling machine including a horizontally disposed cutter, means for rotating said cutter, a vertically reciprocable head, beneath said cutter, a removable work holder on said head, means for reciprocating said head, means operable to automatically stop the movement of said head at the lower end of each stroke of the head, a member for removing said holder from said head, means for connecting said member and holder when said head is in lowered position and for disconnecting the same when said head is raised, and means for moving said member to remove said holder from said head when said head is at the lower end of its stroke.

3. In a milling machine, the combination of a horizontally disposed milling cutter, a vertically reciprocable head beneath said cutter, a work holder carried by said head, means for transmitting motion to rotate said cutter including a clutch and for reciprocating said head including a cam to impart a varying reciprocation to said head, a rigid member on said cam having a fixed position relative to the working surface of said cam, and means operated by said member on said cam for operating said clutch to stop the transmission of motion.

4. In a milling machine, the combination of a horizontally disposed milling cutter, a vertically reciprocable head, a work holder carried by said head and freely removable therefrom, means adapted to interlock with said holder when said head is moved to the end of its stroke and to move said holder from said head clamping jaws pivotally carried by said head at each side of said work holder when in place on the head and adapted to clamp work carried by said holder, means for reciprocating said head, and means operated by the reciprocation of said head for opening and closing said jaws.

5. In a milling machine, the combination of a horizontally disposed milling cutter, a vertically reciprocable head beneath said cutter, a pair of jaws carried by said head, means operated in timed relation to the reciprocation of said head for opening and closing said jaws, a work holding block on said head between said jaws and removable therefrom when said head is at the lower end of its stroke and said jaws are open, and a horizontally reciprocable member for moving said block onto and off said head and adapted to interlock with an end on said block at the lower end of the stroke of said head and to be disengaged therefrom by the up-movement of said head.

6. A milling machine as characterized in claim 5, and further characterized in that said means for removing said block from said head includes a horizontally movable member and a coupling for connecting said member and block, said coupling being operated by vertical movement of said head to couple or uncouple said block and member.

7. A milling machine as characterized in claim 5 and including a horizontally disposed track, a member movable along said track, and means for coupling said member to said block, the coupling of said member to said block and the disconnection thereof being automatically effected by the vertical reciprocation of said head.

8. A milling machine as characterized in claim 5 and including a horizontally disposed track extending laterally from said head and in the horizontal plane of the upper surface of said head when said head is in lowered position, a member movable along said track, manually operable means for moving said member along said track, and interlocking members on said block and member arranged, one to receive the other when said head is moved vertically.

9. In a milling machine, the combination of a horizontally disposed milling cutter, a vertically reciprocable head beneath said cutter, a downwardly extending plunger upon which said head is mounted, a guide for said plunger, a horizontal shaft extending beneath said head and at one side of said plunger, a crank arm on said shaft, a link connecting said arm and plunger to raise said plunger and head, a cam for imparting a varying movement to said shaft and a pivotal connection between said link and plunger, including an eccentric and means for adjusting said eccentric.

10. In a milling machine, the combination of a support provided with bearings, a horizontally disposed milling cutter mounted in said bearings, power transmitting means for imparting rotation to said cutter, a vertical guideway beneath said cutter, a head reciprocable in said guideway toward and from said cutter, jaws pivotally mounted in said head, a work holding block carried by said head between said jaws and removable therefrom in a direction longitudinally of said cutter, means at the lower end of the stroke of the head for moving said block endwise from the head, means for accurately positioning said block on the head to locate the work relative to the cutter, and motion transmitting means for transmitting motion from said power transmitting means to reciprocate said head, said motion transmitting means including a cam for imparting a varying reciprocating motion to said head.

11. In a milling machine, the combination of spaced apart pedestals having bearings, a rotary milling cutter mounted in said bearings and extending across the space between said pedestals, a vertical guideway between said pedestals beneath said cutter, a head reciprocable in said guideway, a pair of work clamping jaws pivotally mounted in said head, arms on said jaws for turning the same, a tubular plunger upon the upper end of which said head is mounted, a rod extending through said plunger, link connections between the upper end of said rod and said arms on said jaws, a horizontal shaft extending across the machine between said pedestals at one side of said plunger, crank arms on said shaft, links connecting the free ends of said crank arms and said plunger, a spring to resist relative longitudinal movement of said rod and plunger, means to engage the projecting end of said rod prior to the plunger reaching the lower end of its stroke to move said rod relative to the plunger and operate said jaws, said jaws being rotated in the opposite direction by said spring upon upward movement of said plunger, gearing within one of said pedestals for transmitting motion to said cutter, a shaft for transmitting motion to operate said plunger through said horizontal shaft and crank arms, a cam on said motion transmitting shaft, an arm on said horizontal shaft to engage said cam, and means carried by said cam for stopping its rotation at the end of each rotation thereof.

12. In a milling machine, the combination of a horizontally disposed milling cutter, a vertically reciprocable head beneath said cutter, a pair of work clamping jaws pivotally mounted in said head, a carrier block for carrying work, said head being formed with a guideway for said block between said jaws, means operated by movement of said head for rotating said jaws, means for moving said block in said guideway in timed relation to the reciprocation of said head, locking means for said block operated in timed relation to the movement of said head, by the reciprocative movement of said head, a tubular plunger to the upper end of which said reciprocable head is secured, and means connected to said plunger to raise and lower said reciprocable head.

In testimony whereof I affix my signature.

HENRY E. MORTON.